Feb. 10, 1948.　　　　S. S. BARKER　　　　2,435,706
APPARATUS FOR CONVEYING AND ASSORTING POULTRY ACCORDING TO WEIGHT
Filed May 11, 1943　　　2 Sheets-Sheet 1
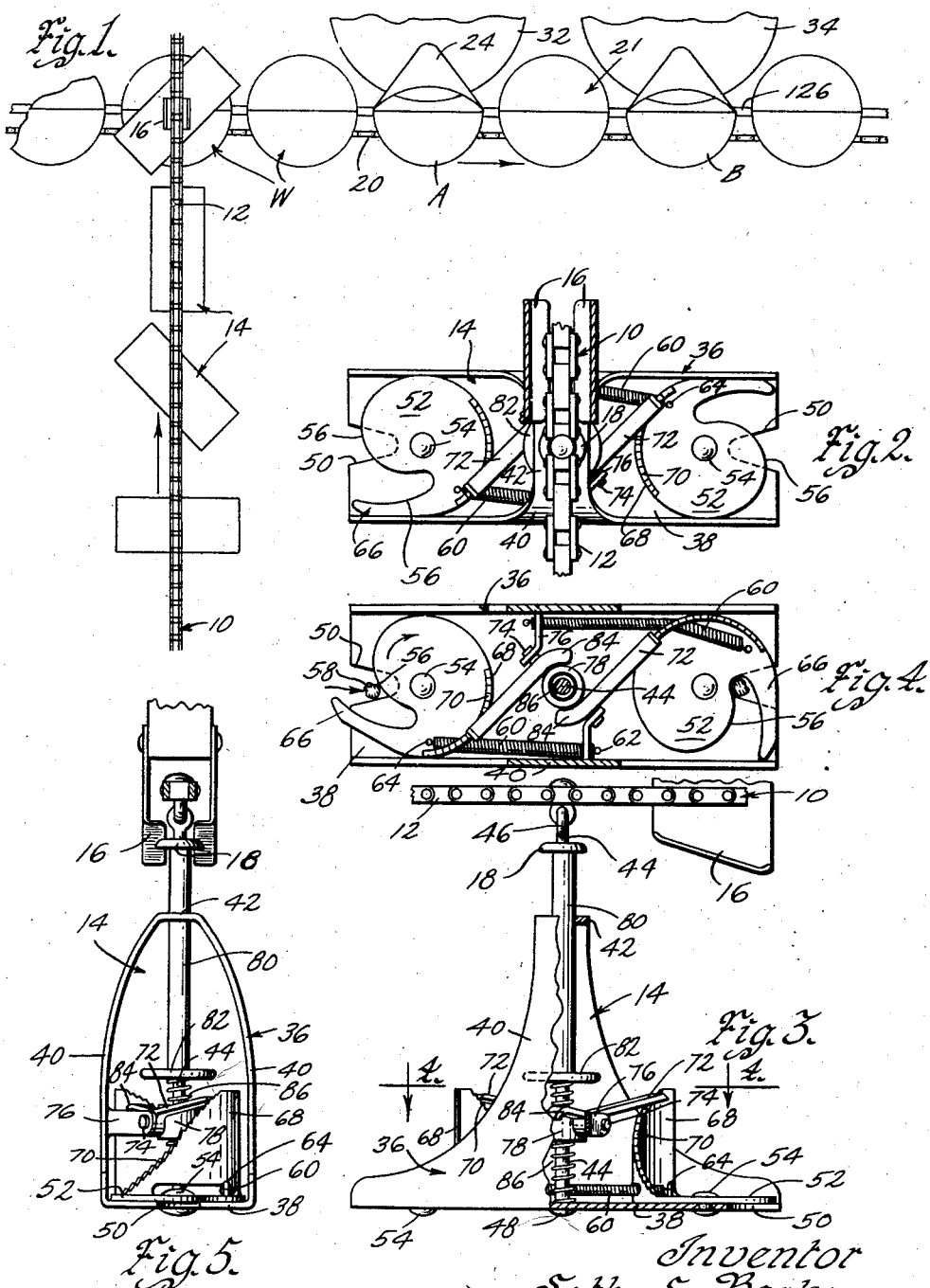
Inventor
Seth S. Barker
by Bair & Freeman
Attorneys

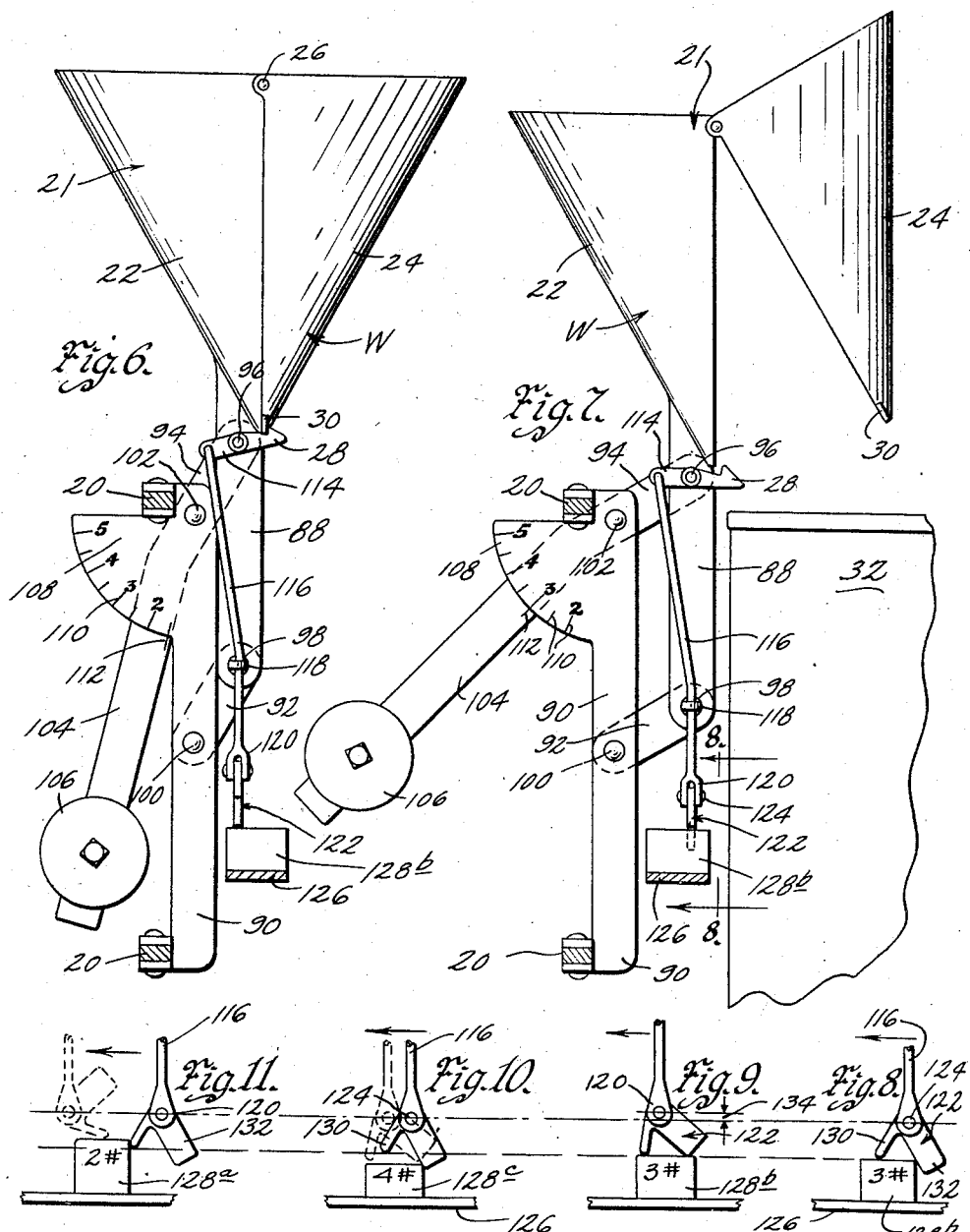

Patented Feb. 10, 1948

2,435,706

UNITED STATES PATENT OFFICE 2,435,706

APPARATUS FOR CONVEYING AND ASSORTING POULTRY ACCORDING TO WEIGHT

Seth S. Barker, Ottumwa, Iowa

Application May 11, 1943, Serial No. 486,516

2 Claims. (Cl. 209—121)

My invention relates to apparatus for handling poultry on a high production basis.

It is an object of my invention to facilitate the handling and classification of poultry in produce houses where the volume of poultry business warrants extensive use of mechanical equipment. It is well known that poultry as a source of meat is gaining tremendously in importance in the nation's markets. Improvements in breeding and raising methods are making possible higher quality and greater uniformity. But methods of preparing and packing poultry for market have in many respects failed to keep pace with the increase in volume of the business.

It is well known also that the shortage of labor, and the relative inexperience and instability of such labor as may be available, make it important to perform as many operations as possible without manual intervention.

It is another object of my invention to provide apparatus for automatically sorting poultry according to weight.

With these and other objects in view, my invention consists in the arrangement and combination of parts whereby the objects of the invention are attained as hereinafter more fully set forth, pointed out in the claims, and illustrated in the accompanying drawings, in which:

Figure 1 is a diagrammatic plan view illustrating the layout of a typical apparatus suitable for carrying out my method;

Figure 2 is a top view illustrating an automatic shackle of my invention, particularly suitable for use in a system of the kind which I shall describe;

Figure 3 is a side view of the shackle shown in Figure 2;

Figure 4 is a horizontal sectional view taken on the line 4—4 of Figure 3;

Figure 5 is an end elevational view of the shackle shown in Figure 2, and particularly illustrates its coaction with the releasing cam;

Figure 6 is an elevational view of an automatic weight responsive receiver;

Figure 7 is a view somewhat similar to Figure 6, but shows the receiver in the position occupied when a bird is discharged;

Figure 8 is a fragmentary detail view as on the line 8—8 of Figure 7, illustrating one stage in the operation of a latch releasing cam which may be used in connection with the receiver of Figures 6 and 7;

Figure 9 is similar to Figure 8, and illustrates another stage in the operation of the latch releasing cam;

Figure 10 illustrates operation of the latch releasing cam under slightly different conditions, and Figure 11 illustrates the action of the latch releasing cam under still another set of conditions.

In the drawings, I have used the reference numeral 10 to indicate generally a conveyor, which may be of any suitable type, such as an endless chain 12, driven by power means (not shown) and carrying a plurality of spaced poultry carrying shackles indicated generally as 14.

My invention contemplates broadly the provision of such a conveyor, equipped with shackles of a type which will automatically release the birds when a certain point on the conveyor is reached. In the apparatus illustrated, I provide an inclined plane or cam surface 16, fixed with relation to the path of the conveyor, and engageable with a collar 18 on each shackle to cause release of the bird supported by that shackle.

Beneath the overhead conveyor 10, I provide a plurality of weight responsive receivers indicated generally by the letter W. In the particular exemplification of my invention illustrated in the drawings, I have shown these receivers as mounted on chains 20, by which they are moved in a direction transverse to the line of movement of the overhead conveyor 10 at the point where the cam 16 is located. The relative speeds of the conveyor 10 and the chain 20 are adjusted so that a receiver W will pass beneath the conveyor 10 each time that a shackle 14 arrives at the release cam 16. The receiver W is provided with a funnel-shaped bucket 21 having a relatively fixed portion 22 with a movable portion 24 attached thereto by hinges 26. The parts 22 and 24 are normally held together by the engagement of a latch 28 with a lug 30.

The bucket 21 is carried on a weight responsive suspension, so that the elevation of the bucket is determined by the weight of the bird dropped into it from a shackle 14, as it passes beneath the conveyor 10. I provide suitable means for releasing the latch 28 at various points along the path of the chain 20, according to the weight of the bird. Thus, for example, if it is a three-pound bird, the latch will be released at the position A in Figure 1, and the bird will be discharged into tub 32. If it is a four-pound bird, the latch will be released at the position indicated as B in Figure 1, and the bird will be discharged into tub 34. It will thus be seen that I have provided a method whereby birds are automatically released from their shackles on the conveyor 10, transferred to automatic weighing devices W, and selectively discharged by the weighing devices into suitable tubs or other vessels, classified according to weight. All these operations of removal from the overhead conveyor, weighing, and placement in grading bins according to weight, have heretofore been performed manually, and my method as herein set forth permits substantial economies in the procedure. In addition, it frees the poultry house operator from the problems of replacing and training workers on these jobs, and the difficulties arising from mistakes made by inexperienced workers.

The shackle 14 includes a frame member 36 having a bottom portion 38, and side members 40, the latter being joined at the top to form a guide portion 42. A support rod 44 is carried from the chain 12 by any suitable type of swinging joint, as illustrated at 46. The rod 44 extends through the bottom 38 of the frame 36, and is suitably fastened thereto at 48 as by welding or riveting. The ends of the bottom portion 38 are provided with notches, indicated at 50. Coacting with each notch is a locking plate 52, pivoted at 54 and having an irregular outline, as seen particularly in Figures 2 and 4. This outline comprises an edge 56 constituting a rather sharp spiral with respect to the pivot center 54. When the leg of a chicken, illustrated at 58 in Figure 4, is moved into the notch 50 and bears against the surface 56 of the locking plate, it tends to rotate the locking plate clockwise against the action of a light spring 60 which is fixed at one end 62 to the bottom 38, and at the other end 64 to the locking plate at a point spaced from the pivot 54.

In Figure 2, the locking plates are illustrated in their normal open position. In Figure 4, the left hand locking plate is illustrated at an intermediate position, after it has rotated somewhat clockwise during the insertion of the leg of the chicken. The right hand locking plate in Figure 4 is illustrated at the fully closed position, after the leg of the chicken has been thrust all the way to the bottom of the notch 50. Each locking plate is provided with a tongue 66 so arranged as to extend across the outer portion of the notch 50 when the locking plate reaches its fully closed position, as illustrated at the right in Figure 4. In this position, of course, the leg of the chicken or other fowl is completely surrounded and securely held.

A portion of the periphery of the locking plate 52 is cut on an arc of a circle around the pivot 54 and is provided with an upstanding curved flange member 68. The upper edge of the member 68 is formed along the general lines of a helix with respect to the axis of the pivot 54. The formation of the member 68 in this respect is seen particularly in Figures 3 and 5. The helical edge of the member 68 is provided with notches or teeth 70, so that it can function as a ratchet, and a pawl member 72 is provided to ride on the teeth 70 and thus to maintain the locking plate 52 in closed position, as illustrated at the right in Figure 4. A pawl 72, as described, is provided for each of the two locking plates, and the pawls are mounted on pins 74 carried by projections 76 on the side members 40 of the frame, and joined by a common collar 78 which encircles the central rod 44. On the rod 44 is a tubular sleeve 80 on which the collar 18 is mounted. The tubular sleeve 80 extends slidably through the guide portion 42 of the frame. At its lower end, the sleeve 80 carries a disc 82.

The pawls 72 are provided with short, rounded lever ends 84, slightly upturned, so that they extend to a higher level than other portions of the pawl when the latter is engaged with the teeth on the member 68. The disc 82 is adapted to engage the ends 84 of the pawls and when pressed down against them serves to release the pawls from the ratchet teeth 70, thus allowing the locking discs 52 to open and release the bird being carried. A coil spring 86 is carried on the rod 44 between the bottom 38 and the disc 82, the opening through the collar 78 being made large enough to provide ample clearance. The spring 86 serves to raise the disc 82, the sleeve 80 and the collar 18, so that the disc 82 is normally out of contact with the pawl lever portions 84. When the shackle is carried along by the conveyor, however, to the point where the collar 18 is engaged by the cam 16, as may be seen in Fig. 3, the sleeve 80 is moved downwardly, causing the disc 82 to press against the ends 84 of the pawl members and release the locking discs. As soon as the shackle has passed the cam 16, the disc is moved up again by the spring 86, and the pawls are again ready for engagement with the ratchet teeth, inasmuch as the tooth engaging end, being longer than the lever end 84, moves downwardly under the influence of gravity. A spring can be provided for positive operation if that be desired.

When the fowl is released upon depression of the collar 18 by the cam 16, it drops into one of the buckets 21, the operation of the conveyor chains 20 by which the buckets are advanced being timed, as previously described, so that a bucket comes below the shackle at the proper instant. The fixed member 22 of the bucket is fastened to a vertical post 88. This post is attached, in turn, to a vertical support 90 by links 92 and 94, pivoted to the members 88 and 90 in a parallelogram arrangement, the pivots being indicated at 96, 98, 100 and 102 in Figures 6 and 7. The link 94 is extended beyond the member 90 to form an arm 104 on which a weight 106 is adjustably carried. The member 90 may be provided with a graduated quadrant 108 bearing indicia 110 which, in conjunction with a reference mark 112 on the arm 104, serve to indicate the weight of the fowl carried in the bucket 21. It will be apparent from the structure of the linkage described, that when a weight is placed in the bucket, the link 94 and the arm 104 will swing clockwise about the pivot 102, raising the weight 106 to a position of equilibrium, at which the system will ultimately come to rest. This equilibrium position will vary, however, according to the weight of the bird held in the bucket 21. The exact position for a bird of given weight can be varied by adjustment of the weight 106 along the arm 104.

Provision of the bucket 21 in the funnel shape indicated, has an advantage which is illustrated particularly in Figure 7. It will be noted from this figure that when the movable portion 24 of the bucket is released, the fowl carried in the bucket is discharged in a sideward direction, so that the vat or barrel 32 receiving the fowl can be placed to one side of the bucket conveyor system. This simplifies construction of the conveyor, and also greatly reduces the problem of handling the barrels or tubs 32.

To accomplish selective discharge of the birds from the buckets according to weight, I have devised a latch controlling means having particular advantages. The latch 28 is pivoted at 96, and extends beyond the pivot point in the form of a lever arm 114. An operating rod 116 is connected to the outer end of the lever arm, and is slidably guided through an eye 118 provided on the pivot 98. At its lower end, the operating rod is split or forked to form a clevis end 120 in which a trip member 122 is carried on a pivot 124.

On a fixed support, I provide a rail or cam bar 126 extending along the side of the conveyor parallel to the lower feed chain 20, just below the clevis end 120 of the operating rod 116. On this cam bar I mount operating blocks or cams of various heights. In Figures 8-11, I have illustrated such cams, and in Figures 8 and 9 I show cams designated as 128b, of a height particularly suitable, for example, to cause release of the latch on buckets carrying fowls weighing substantially three pounds. In Figure 10, I illustrate a cam block 128c of somewhat lower height, being suitable, for example, to release the latch on a bucket having a fowl weighing substantially four pounds. In Figure 11 is shown a higher cam block 128a, suggested as being suitable for emptying a bucket carrying a two-pound fowl.

It will be understood that the level of the pivot 124 at the clevis end of the operating rod 116 will depend upon the weight of the fowl carried in the associated bucket, the heavier the fowl, the lower being the position of the pivot, as determined by the equilibrium point of the scale balance arrangement.

My cam trip system has the advantage that neither a cam block which is too high nor one which is too low will release the latch. Only one of the proper height for the weight carried in the bucket will perform this operation. It is thus possible to arrange the cams in any desired order along the cam bar 126. They need not be arranged in order of decreasing fowl weights.

Assuming that the bucket carries a three-pound fowl, we see in Figure 8 the trip member 122 approaching the cam block of the proper height to release the latch. The cam block is fixed in position, and the carrying rod 116 may be regarded as moving toward the left in the figure. The trip member consists of a roughly L-shaped piece, having a relatively short advance arm 130 and a somewhat longer, heavier arm 132, which, because of its greater weight, normally hangs somewhat lower than the arm 130. Figure 8 illustrates the position in which the trip member normally hangs.

Under these circumstances, the advance arm 130 will clear the top of the cam block 128b as the carrying rod moves above it. The block is of sufficient length in the direction of travel of the conveyor so that both arms of the trip member must ride across the top of the block. The arm 132 must therefore rise to the top surface of the block while the arm 130 is still sliding across it. The result will be a lifting of the pivot point 124 by an amount indicated at 134 in Figure 9. This is sufficient to cause movement of the lever 114, and release of the latch 28 from the coacting member 30, which results in dumping the fowl into the tub adjacent cam block 128b.

In Figure 10, we have an illustration of the operation of the trip member when the bucket carries a three-pound fowl and passes the cam 128c, which is of the proper height to release four-pound fowls. As before, the arm 120 of the trip member will clear the cam block, but when the arm 132 of the trip member rises to the top of the block, as indicated in dotted lines in Figure 10, the height of the block is insufficient to cause any lifting of the rod 116. In Figure 11 is shown the operation of the trip member when it engages a cam block too high for the load carried in the bucket. If the load in the bucket is three pounds, and the cam 128a is the one set for two pounds, as suggested, the arm 130 of the trip member will be caught by the leading edge of the cam block, with the result that the trip member will be turned about 90°, as illustrated in dotted lines in Figure 11, and no lifting effect on the rod 116 will take place.

It will be understood, therefore, that I have devised a very simple and effective arrangement for distributing the birds according to weight, and a method which does not require distribution in any particular sequence, since the cams can be arranged in whatever order makes the handling of the vessels 32 and 34, etc., most convenient. The order of the cams can be changed as desired without adversely affecting the operation of the system in any way.

Changes in details of construction of the apparatus may be made without departing from the spirit of the invention as defined in the claims.

I claim:

1. In conjunction with a traveling scale mounted receiver having discharge means normally held closed by a latch, latch releasing means consisting of a member which disengages the latch when vertically raised a predetermined distance, a trip dog pivotally carried on said member, said dog having two horizontally spaced depending arms, aligned in the direction of travel of said receiver, and being balanced so that the tip of the leading arm is somewhat higher than that of the trailing arm, and a fixed cam block having a length greater than the distance between said arms, the elevation of the top of said block being less than that of the tip of the leading arm of the dog, and greater than that of the tip of the trailing arm, whereby when both tips are on top of the cam, the dog will be raised, lifting the latch disengaging member by said predetermined amount.

2. A poultry handling device including a plurality of weight-responsive receivers mounted to move along a predetermined path, mountings for said receivers adapted to make the vertical elevation of the receivers vary according to the load carried therein, each mounting having a substantially vertical post supporting its receiver, a substantially parallel vertical support, parallel links pivoted respectively to the post and support, an inclined arm on one link and a weight adjustably mounted on the arm; each said receiver comprising members pivoted together at their upper ends, a latch pivoted on the axis of the pivot of one link to its position and adapted in one position to latch together the lower ends of the members of a receiver, a rod pivoted to each such latch and slidably supported transversely of the axis of the pivot of the other link to the post, a trip-dog on the rod and a plurality of cams spaced along said path, each cam being adapted to cause discharge of the rod from a receiver passing by, by engagement with the dog when the receiver is at a predetermined elevation.

SETH S. BARKER.

REFERENCES CITED

The following references are of record in the file of this patent:

UNITED STATES PATENTS

| Number | Name | Date |
| --- | --- | --- |
| 899,391 | Farrell | Sept. 22, 1908 |
| 1,467,605 | Chazen | Sept. 11, 1923 |
| 2,035,948 | DeVout | Mar. 31, 1936 |
| 1,355,999 | Nelson | Oct. 19, 1920 |
| 2,096,572 | Brunkow | Oct. 19, 1937 |
| 2,138,475 | Hilton | Nov. 29, 1938 |
| 716,692 | Ellis | Dec. 23, 1902 |
| 952,936 | Nummedahl | Mar. 22, 1910 |
| 897,361 | Ferris | Sept. 1, 1908 |
| 1,019,555 | Taylor | Mar. 5, 1912 |
| 360,154 | Hodges | Mar. 29, 1887 |

FOREIGN PATENTS

| Number | Country | Date |
| --- | --- | --- |
| 504,057 | Great Britain | Apr. 19, 1939 |